United States Patent [19]

Sakai et al.

[11] Patent Number: 4,881,160
[45] Date of Patent: Nov. 14, 1989

[54] SELF-TUNING CONTROLLER

[75] Inventors: Yoshikatsu Sakai; Yasuo Nakai; Asao Miyabe; Takafumi Kawano, all of Tokyo, Japan

[73] Assignee: Yokogawa Electric Corporation, Tokyo, Japan

[21] Appl. No.: 163,915

[22] Filed: Mar. 3, 1988

[30] Foreign Application Priority Data

Mar. 9, 1987 [JP] Japan ................................. 62-53494
Apr. 20, 1987 [JP] Japan ................................. 62-97165

[51] Int. Cl.$^4$ ............................................. G05B 13/00
[52] U.S. Cl. ...................................... 364/161; 364/157
[58] Field of Search ............................... 364/157–163; 318/561, 609, 610

[56] References Cited

U.S. PATENT DOCUMENTS

| | | | |
|---|---|---|---|
| 4,441,151 | 4/1984 | Hayashibe | 364/162 |
| 4,602,326 | 7/1986 | Kraus | 364/160 |
| 4,754,391 | 6/1988 | Suzuki | 364/162 |
| 4,768,143 | 8/1988 | Lane et al. | 364/160 |

Primary Examiner—Allen MacDonald
Attorney, Agent, or Firm—Moonray Kojima

[57] ABSTRACT

A controller in which proportional integral (PI) arithmetic is effected on a deviation between a measurement or process signal from a process or controlled system and a control set value, and a resultant manipulation signal is outputted to the process. A waveform of the process signal or the deviation signal is observed. PI arithmetic parameters undergo self-tuning so that the measurement result becomes a preset response target. In the preferred embodiment, means are provided for performing self-tuning on the PI arithmetic parameters including waveform observing means for using an area ratio of a first area to a second area as one of the evaluation indexes which represent patterns of the measured waveforms, the ratio being associated with the process signal or the deviation signal extending from a first generation timing of a first peak of the process signal or the deviation signal, to a subsequent second generation timing of a second peak, the second area being associated with the process signal or the deviation signal extending from the second generation timing to a timing given by second timing+(second timing - first timing).

12 Claims, 14 Drawing Sheets x: Initial Value
★: Convergent Value

Process Model Characteristic $G_P(S) = \dfrac{e^{-10s}}{1+10s}$

Gain: 1, Time Constant; 10 sec., Dead Time: 10 sec.

Obtained from P₁ and P₂

SELF-TUNING CONTROLLER

BACKGROUND OF THE INVENTION

1. Field of Invention

This invention relates to a self-tuning controller which comprises a PI controlling means for effecting at least proportional integral (PI) arithmetic on a deviation signal between a process variable from a process and a control set value, to automatically adjust PI arithmetic parameters to an optimum value; and more particularly, to a self-tuning controller for adjusting the PI arithmetic parameters so that a response waveform exhibits an optimum response after observing the response waveform of the process variable or the deviation signal relative to disturbances created at random without the disturbances influencing the process.

2. Description of the Prior Art

In the prior art PI adjusting devices used with feedback control, the PI arithmetic parameters were manually set by a human operator based on his or her skills, technique, knowledge and experience. This is still the situation in the art. Manual setting, however, causes many disadvantages and defects. The process control is temporarily or constantly disturbed under such circumstances that start up of the process is affected, load fluctuates, and unexpected disturbances are intermixed, or under the condition of the system having non-linear gain properties. In some cases, an economical loss is brought about depending on the situation.

To resolve this problem, controllers for automatically tuning the PI arithmetic parameters have been proposed, but, none of them has been entirely satisfactory. Among them the main self-tuning controllers are as follows.

(i) A first type of controller is arranged such that an auxiliary controller is parallely connected to a main controller, gain of the auxiliary controller is increased to cause oscillation, and the PI arithmetic parameters are determined from the amplitude and frequency thereof on the basis of a so-called Z·N thereshold sensitivity method proposed by Ziegler and Nichols. This type of controller is disclosed in "A study of adaptive control system based on threshold sensitivity method", Toshiyuki Kitamori, appearing in A collection of Treatises of the Japan Measurement Automatic Control Association, 1970, pp55-60, Vol. 6.

(ii) A second type of controller is arranged such that a limit cycle is generated by use of an ON-OFF generator, and the optimum PI arithmetic parameters are determined from the amplitude thereof. This type of controller is disclosed in "PID automatic setting type adaptive controller" by Sumi and Fukuda, appearing in A collection of Preparatory Papers of the 12th Scientific Lecture of the Japan Automatic Control Association, pp617-624.

(iii) A third type controller is arranged such that pattern recognition means, i.e. performance measurement, for observing a behavior as a controlled variable is provided; disturbances produced at random in the control system are recognized without the disturbances influencing the process; the recognized result is compared with an optimum response model; and the optimum PI arithmetic parameters are determined so that the recongnized result of the pattern approximates the response model. This type of controller is disclosed in adaptive control Systems, Pergamon Press, 1963, pp 1-18.

(iv) A fourth type controller utilizes the technique described in paragraph (iii) and uses information on amount of overshoot, damping factor obtained from a peak value and a cycle in order to recognize the response pattern in connection with the disturbance in the control system. This controller is disclosed in U.S. Pat. No. 4,602,326.

Turning to FIG. 1, there is depicted, the controller which is shown in FIG. 1 of Page 2 of the book entitled "Adaptive Control Systems" described in paragraph (iii) hereinabove. This controller comprises observing, i.e. performance measurement, means 21 for observing a behavior or pattern associated with a process variable PV transmitted from a process 1 and a deviation signal by inputting a process variable PV, a control set value SV and a deviation signal between the process variable and the control set value; and an adaptive controller 22 for controlling the arithmetic parameters of a controller 2 by inputting evaluation indexes or figures of merit, which represent the patterns from the pattern observing means 21, with the result that this figure of merit exhibits an optimum response.

FIG. 2 illustrates the controller disclosed in U.S. Pat. No. 4,602,326 which fundamentally uses the technique described in FIG. 1, and comprises first comparator means 20 for obtaining a deviation between the process variable PV and the control set value SV; detecting means 21 for detecting characteristics of a pattern by observing the pattern of the process variable; second comparator means 22, coupled to the detecting means 21, for comparing a characteristic value of the detected pattern with a desired value of a preset pattern; and adjusting means 2, coupled to the second comparator means 22, for outputting a manipulated variable MV so that the process variable PV substantially accords with the control set value SV. Adjusting means 2 is constituted to halt action, e.g. tuning, to modify the arithmetic parameters, if the difference between the characteristic value of the detected pattern and the desired value of the preset pattern is smaller than a predetermined value.

Detecting means 21 functions in such a manner that when the pattern, comprising a waveform of response signal, of the process variable varies in the manner depicted, for example, in FIG. 3., first, second and third peak values $E_1$, $E_2$ and $E_3$ are detected; and an overshoot quantity, a damping factor and a cycle $T_p$ between the first peak and the third peak are obtained in order that these values serve as the characteristic values for the patterns. In this case, the overshoot quantity is given by $-E_2/E_1$, while the damping factor is given by $(E_3-E_2)/(E_1-E_2)$.

There arises, however, a problem inherent in the above prior art controllers. In the controllers mentioned in paragraphs (i) and (ii), it is required to forcibly impart disturbances (i.e. identifying signals) to the controlled system when the process is brought into oscillation, or when determining the arithmetic parameters. For this reason, the influences due to the disturbances are more or less exerted on the process.

The conventional controllers of FIGS. 1 and 2 do not adppt the method of forcibly imparting disturbances to the process system when determining the PI arithmetic parameters, or when putting the process into the oscillatory state. These controllers are superior in that disturbances do not influence the controlled system. The FIG.

2 controller uses one method of the FIG. 1 embodiment, but, disadvantageously, has the following problems.

(A) The detecting means 21 detects the first, second and third peak values $E_1$, $E_2$ and $E_3$ of the response waveforms, which values are defined as the characteristic values of the patterns. Therefore, where the response waveforms are, as illustrated in FIGS. 4(A) and 4(B), similar to each other, the overshoot quantities and the damping values thereof are the same, if their amplitudes are different from each other. For this reason, when the amplitude of the waveform is small, the optimum arithmetic parameters are not tuned, thereby providing more unstable properties.

(B) The adjusting means 2 is arranged to stop tuning the arithmetic parameters if the difference between the characteristic value of the detected pattern and the desired value of the preset pattern decreases below the predetermined value, and hence it takes a substantial amount of time to pursue the arithmetic parameters up to the area of the optimum values.

SUMMARY OF THE INVENTION

An object of the invention is to provide a self-tuning controller which eliminates the necessity of relying upon the skilled technique, knowledge and experience of a human operator when tuning the PI arithmetic parameters.

To this end, according to one aspect of the invention, there is provided a self-tuning controller which improves the technique described in the above paragraph (iii) and FIG. 1, and is capable of setting the optimum PI arithmetic parameters by accurately recognizing the response pattern, within a short period of time, with no influence caused by noises and requiring no retrieval of the third peak for recognition of the response pattern in connection with the disturbances of the control system.

According to another aspect of the invention, there is provided a self tuning controller capable of invariably tuning the optimum arithmetic parameters within a short period of time regardless of the magnitude of the observed waveform.

According to still another aspect of the invention, there is provided a self tuning controller equipped with a pre-adapter in which the optimum arithmetic parameters are set at the time of start up.

DETAILED DESCRIPTION OF THE PREFERRED EMBODIMENTS

Figure 1:
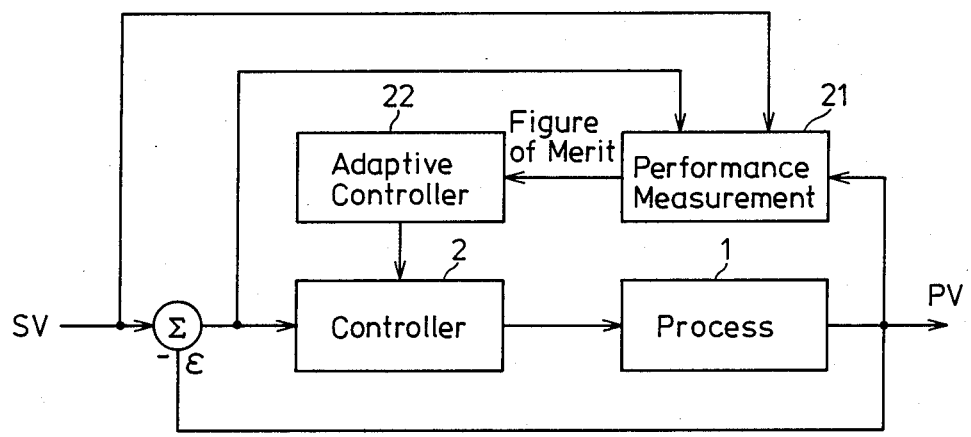
FIGS. 1 and 2 are block diagrams depicting prior art self tuning controllers.
Figure 2:
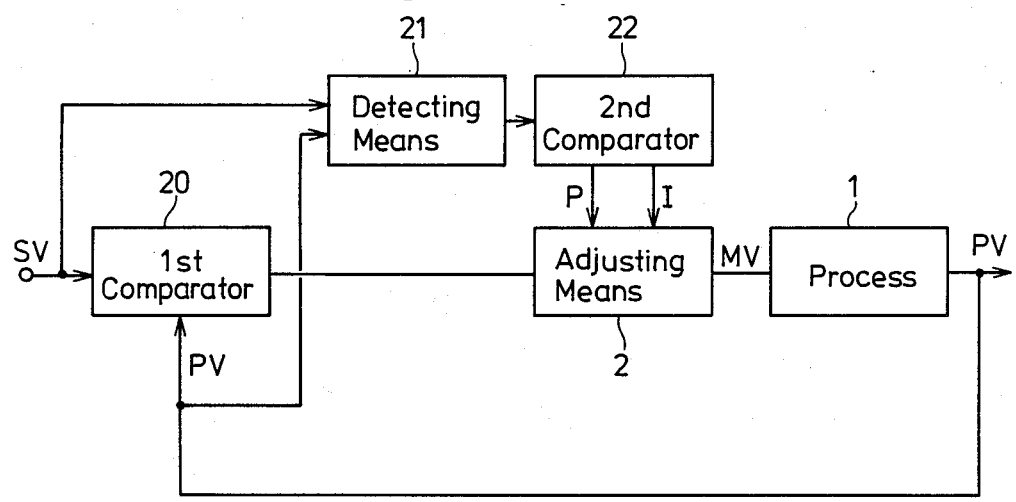
Figure 3:
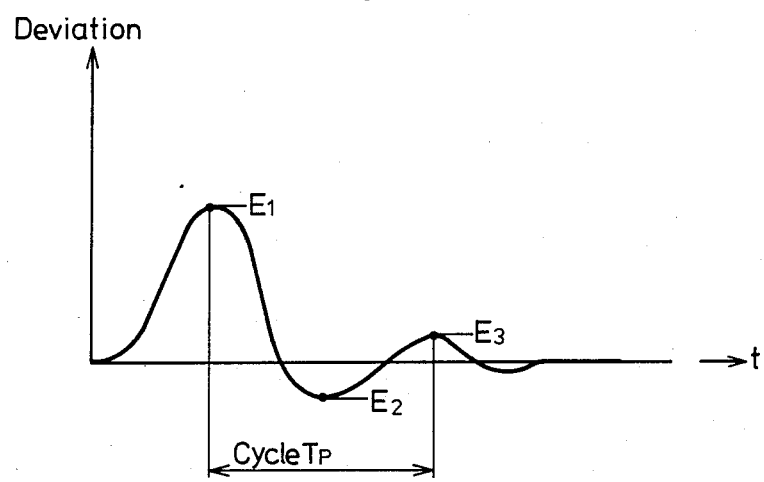
FIGS. 3, 4(a), and 4(b) are waveform diagrams depicting problems inherent in the prior art controllers.
Figure 4A:
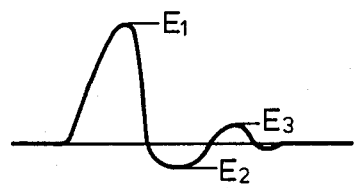
Figure 4B:
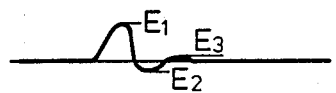
Figure 5:
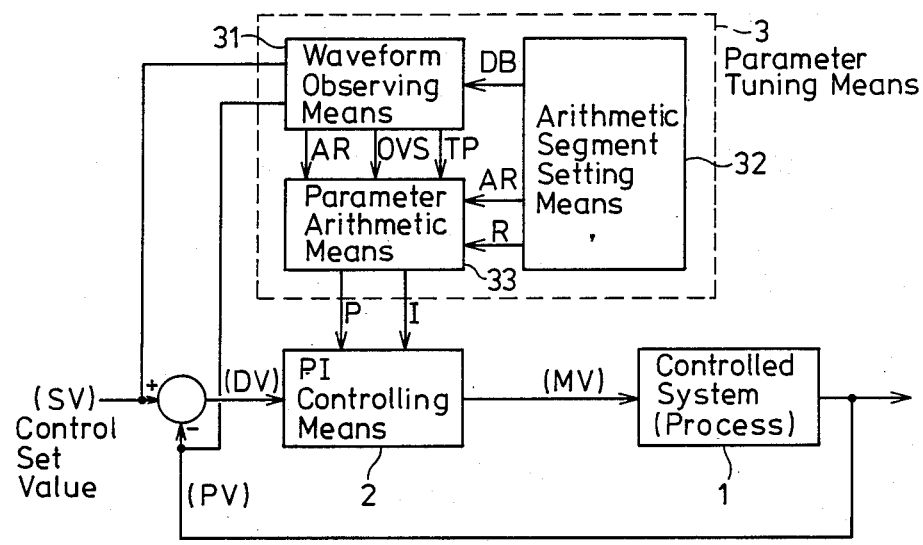
FIG. 5 is a block diagrams depicting the function in one illustrative embodiment of the invention.

Turning to FIG. 5, there is depicted a block 1 indicating a controlled system, that is, the process. It is assumed that the dynamic properties of the controlled system vary depending on variations in amount of production, modifications in control set value, and a variety of disturbances. A PI controlling means 2 outputs a manipulated variable MV to controlled system 1. The manipulated value is obtained by effecting at least proportional integral (PI) arithmetic on a deviation signal DV between a process variable PV from controlled system 1 and a control set value SV. A parameter tuning means 3 tunes the PI arithmetic parameters of PI controlling means 2 in accordance with the waveform pattern of the process variable or the deviation signal DV.

Parameter tuning means 3 comprises waveform observing means 31, arithmetic segment setting means 32 and parameter arithmetic means 33. Waveform observing means 31 observes a waveform of the process signal or the deviation signal DV to detect a generation timing $t_1$ of a first peak $DV_1$ of the signal waveform and a generation timing $t_2$ of the second peak $DV_2$ thereof, and outputs an evaluation index which represents the pattern of the observed waveform by executing a predetermined arithmetic operation. The arithmetic segment setting means 32 serves to set segments for selecting operational expressions by which the PI arithmetic parameters are computed. The parameter arithmetic means computes such PI arithmetic parameters that the evaluation index from waveform observing means 31 becomes a response target which has previously been set in arithmetic segment setting mean 32.

Waveform observing means 31 provided in parameter tuning means 3 observes the waveform of the process variable PV or the deviation signal DV. Observing means 31 further computes both an area $A_1$ associated with the process variable or the deviation signal extending from the generation timing $t_1$ of the first peak of the signal waveform to the subsequent generation timing $t_2$ of the second peak, and an area $A_2$ associated with the process variable or the deviation signal extending from the generation timing $t_2$ to a subsequent timing given by $t_2 + (t_2 - t_1)$. Based on these areas, an area ratio is obtained, namely, $AR = A_2/A_1$. This area ratio AR is outputted as one of the evaluation indexes which represent the waveform pattern.

Parameter arithmetic means 33 computes the PI arithmetic parameters on the basis of some evaluation indexes including the area ratio AR given by waveform observing means 31.

Figure 6:
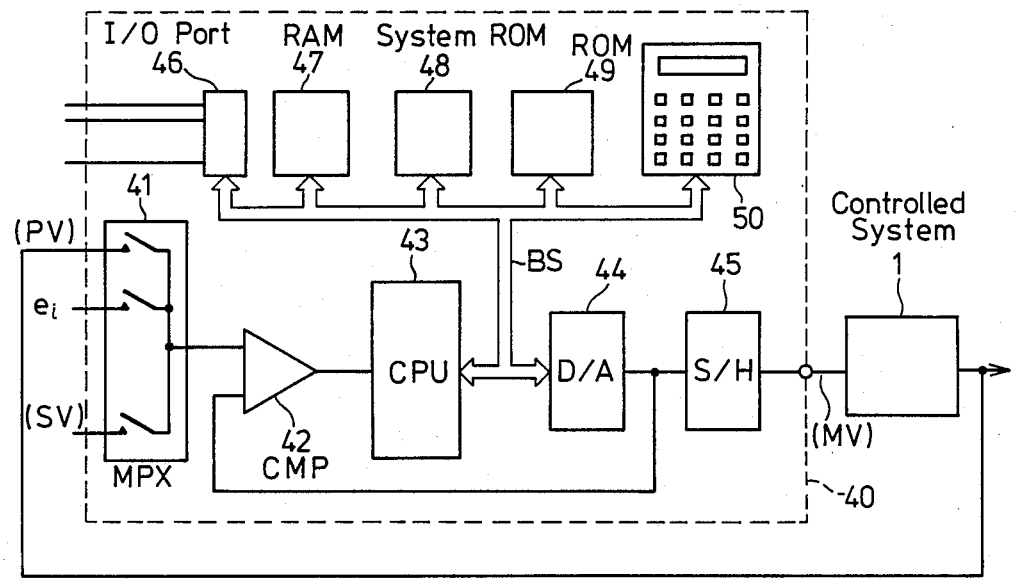
FIG. 6 is a block diagram depicting an apparatus for attaining the function of FIG. 5.

FIG. 6 is a block diagram of one example of an adjusting device according to the invention. Part of the construction of the device is disclosed in U.S. Pat. No. 4,149,256. In FIG. 6, an adjusting device, generally indicated as 40, inputs process variable PV from controlled system 1, and control set value SV, and at the same time outputs a manipulated variable MV to controlled system 1. Adjusting device 40 comprises a multiplexer 41 for selectively sequentially inputting process variable PV, a variety of analog signals $e_1$ and control set value SV; a comparator 42 for receiving signals selected by multiplexer 41 as one input; a microprocessor 43 which inputs the signals transmitted from comparator 42; a D/A (digital to analog) converter 44 for converting digital signals from microprocessor 43 into analog signals; a sample and hold (S/H) circuit 45 for holding outputs of D/A converter 44 at a predetermined timing, the outputs of which are changed into manipulation signals MV which are outputted to controlled system 1; an I/O input/output) port 46; a RAM (random access memory) 47 for storing various kinds of data; a system ROM (read only memory) 48 for storing programs of the principal operation which are to be executed by microprocessor 43; a ROM 49 for storing programs that, for example, a user creates in accordance with the process; and a display keyboard 50. The components such as I/O port 46, RAM 47, system ROM 48, ROM 49 and display keyboard 50 are all connected through adata bus BS to microprocessor 43.

System ROM 48 stores the programs required when microprocessor 43 performs functions as the waveform observing means 31 (see FIG. 5), the parameter arithmetic means 33 and PI controlling means 2, and also data indispensible for the step wherein microprocessor 43 functions as arithmetic segment setting means 32 for setting the segments for selecting the operational expressions by which the PI arithmetic parameters are computed. Note that the system ROM 48 and ROM 49 may be replaced by one shared ROM.

One example of the operation of the apparatus of FIG. 5 will now be discussed in connection with the flow chart of FIG.7. To start with, microprocessor 43 selectively sequentially applies process variable PV, control set value SV and other analog signals $e_1$ to multiplexer 41 in accordance with the system program stored in system ROM 48. These signals are respectively converted into digital signals (see Step 1) by making use of an A/D (analog to digital) converter loop comprising comparator 42, microprocessor 43 and D/A converter 44.

Next, microprocessor 43 makes a judgment as to whether a deviation DV between process variable PV and control set value SV falls within a range of preset value width DB or not (Step 2). When DV>DB, the program moves to Step 3. The task in Step 3 is to observe the waveform of process vaiiable PV or deviation DV between process variable PV and control set value SV in accordance with the system program based on the function of waveform observing means 31 depicted in FIG. 5, thus analyzing a pattern of the observed waveform. Upon completion of the pattern analysis, an evaluation index of the observed waveform is computed. (Steps 4 and 5)

Figure 8:
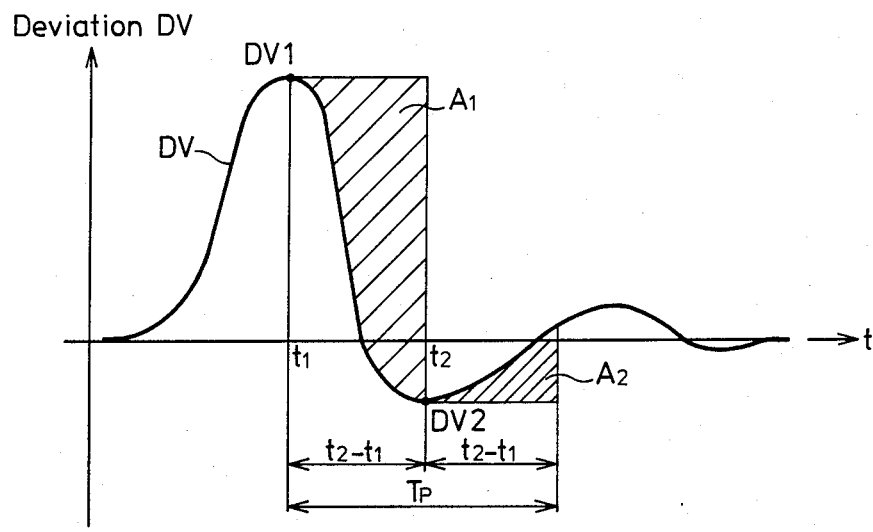
FIG. 8 is a graph depicting a waveform observing method used in the waveform observing means.

FIG. 8 depicts a response waveform of deviation signal DV when a load fluctuates. The response waveform sharply varies when the load fluctuates. This waveform, however, exhibits a gradual shrinkage in variation by operation of PI controlling means 2, and finally the variations converge to zero.

Waveform observing means 31 observes behavior of deviation signal DV and computes an area $A_1$ associated with deviation signal DV extending from a subsequent timing $t_1$, i.e. a generation timing of a first peak, at which first peak $DV_1$ of the signal waveform of deviation signal DV is obserted to a timing, i.e. a generation timing of a second peak, at which the second peak $DV_2$ is observed, and an area $A_2$ associated with the generation timing $t_2$ of the second peak to a subsequent timing obtained by $t_2+(t_2-t_1)$, i.e. that timing at which a period of $t_2-t_1$ has passed from $t_2$. The area ratio AR of areas $A_1$ to $A_2$ is thus obtained. Computations of area $A_1$, area $A_2$ and area ratio AR are given by the following formulas.

$$A_1 = \int_{t_1}^{t_2} (DV_1 - DV)dt \quad (1)$$

$$A_2 = \int_{t_2}^{t_2+(t_2-t_1)} (DV - DV_2)dt \quad (2)$$

$$AR = \frac{A_2}{A_1} \quad (3)$$

wherein operational expression (1) is intended to obtain area $A_1$ depicted with oblique lines in FIG. 8, and operational expression (2) is likewise intended to obtain area $A_2$ depicted with oblique lines in FIG. 8.

A maximum overshoot OVS is given by the following operational expression.

$$OVS = -\frac{DV_2}{DV_1} \quad (4)$$

An oscillation cycle Tp is given by the following operational expression (5).

$$Tp = 2 \cdot (t_2 - t_1) \quad (5)$$

Information on area ratio AR, overshoot OVS and oscillation cycle Tp are imparted by means 31 to parameter arithmetic means 32 as evaluation indexes which represent the observed waveforms.

In the invention controller, waveform observing means 31 supplies area ratio AR of area $A_1$ to area $A_2$ to parameter arithmetic means 33 as one of the evaluation indexes of the observed waveforms, the areas $A_1$ and $A_2$ being associated with the observed waveforms, each extending from the generation timings of the first and second peaks of the observed waveforms. As a result, it is not required to detect a third peak. Hence, advantageously, the invention is not subjected to noise interference.

Figure 9:
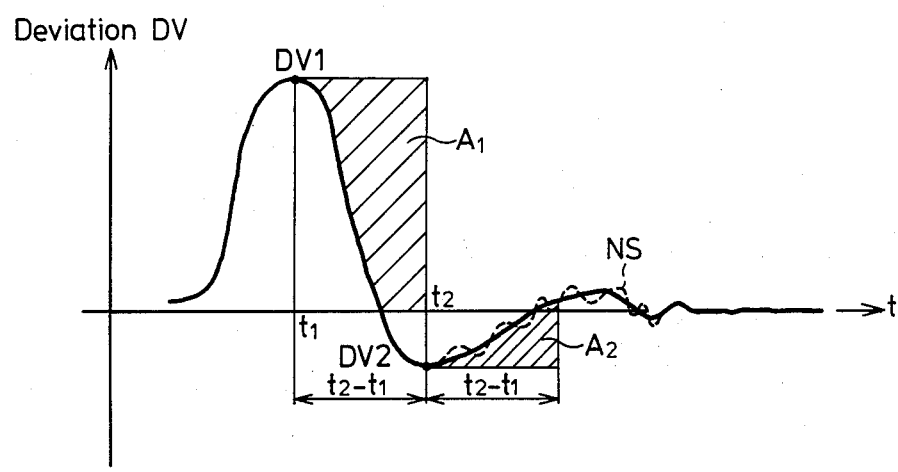
FIG. 9 is a graph depicting the influence caused by noises contained in the observed waveform.

FIG. 9 depicts the influences due to noises contained in the observed waveforms. According to the control system under feedback control, in the great majority of cases, the response waveform of process variable PV or deviation DV generated with fluctuations in load, the modifications of the control set value and other disturbances sharply varies at its initial stage. Consequently, it is relatively easy to detect the first and second peak values $DV_1$ and $DV_2$. The amplitude decreases in the vicinity of the third peak. For this reason, when detecting the third peak, it may happen that an amplitude of noises NS is mistakenly detected as the third peak, with the result that false evaluation indexes are provided.

In the invention, there is obtained area ratio AR of area $A_1$ to area $A_2$ which are associated with the observed waveforms extending from generation timings $t_1$ and $t_2$ of the first and second peaks. Where area ratio AR serves as the evaluation index, the area of the signal waveform, i.e., area $A_2$ marked with oblique lines, is not influenced by the intermixed noises, even if observed waveform DV is, as indicated by the broken lines in FIG. 9, intermixed with noises NS. It is because a portion larger than the signal waveform, in the case of non-presence of the intermixed noises, and a portion smaller than this signal waveform offset each other.

Figure 7:
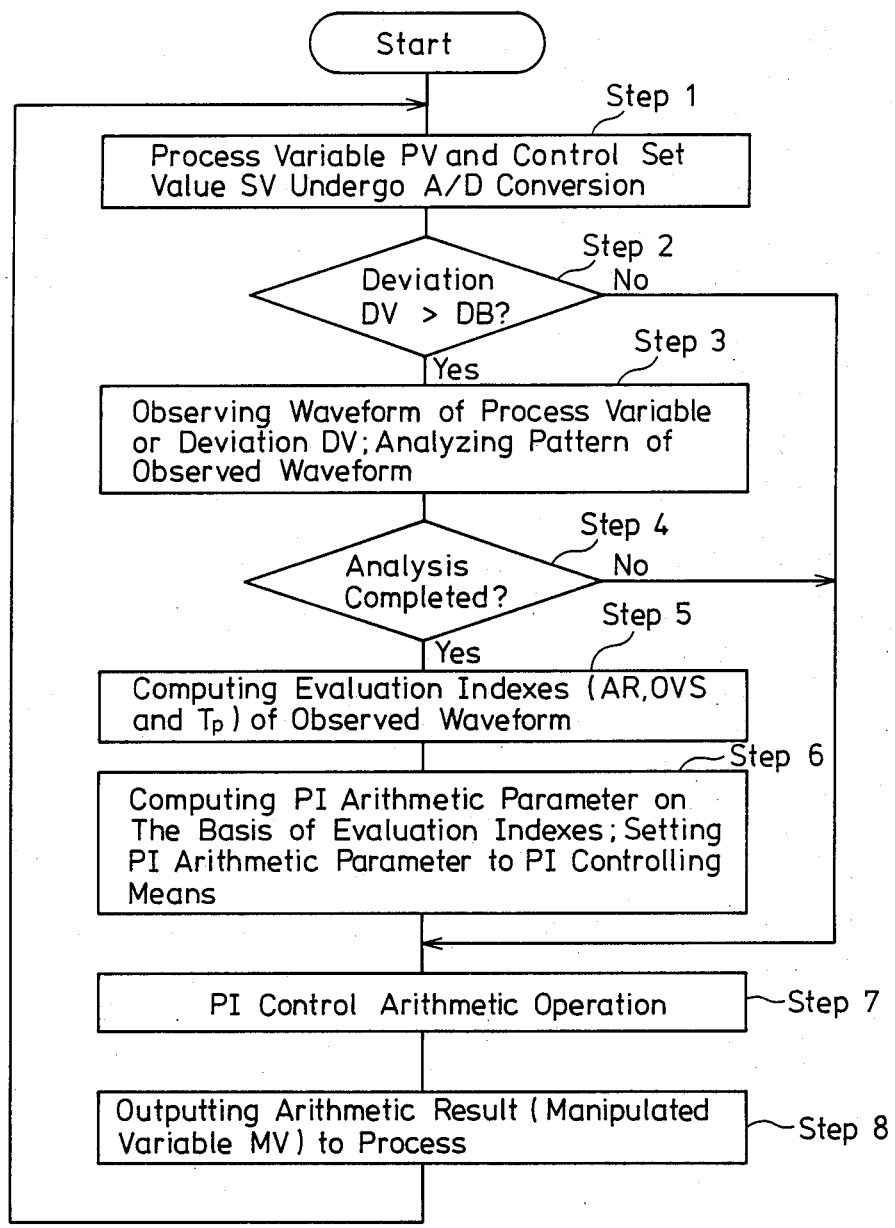
FIG. 7 is a flow chart depicting one example of the operation of the apparatus of FIG. 6.

After the evaluation indexes (AR, OVS and Tp) of the observed waveforms have been computed, as described in Step 5 of FIG. 7, parameter arithmetic means 33 selects the operational expressions by which the PI arithmetic parameters previously stored in arithmetic segment setting means 32 are obtained. The PI arithmetic parameters are computed in conformity with the thus selected operational expressions. The PI arithmetic parameters are set, i.e. tuned, in the PI controlling means 2 (Step 6 of FIG. 7). Detailed description of Step 6 will be given hereinbelow.

PI controlling means 2 performs PI arithmetic operation by using the PI arithmetic parameters which are set or modified by parameter arithmetic means 33 (Step 7). Subsequently, the arithmetic result is outputted to controlled system 1 as a manipulated signal MV (Step 8).

In Step 2, if the deviation DV falls within a range of preset value width, ie self-tuning starting deviation jet value, DB, that is DV<DB, it can be considered that the control is under favorable conditions. The program proceeds to Step 7. Then, the PI control arithmetic operation is executed by use of the preset PI arithmetic parameters. In Step 4, if the patterns of the observed waveforms are not yet analyzed, i.e. the case where the analysis is not yet completed because a considerable time is needed until the first and second peaks are observed, the program similarly moves to Step 7.

Figure 10:
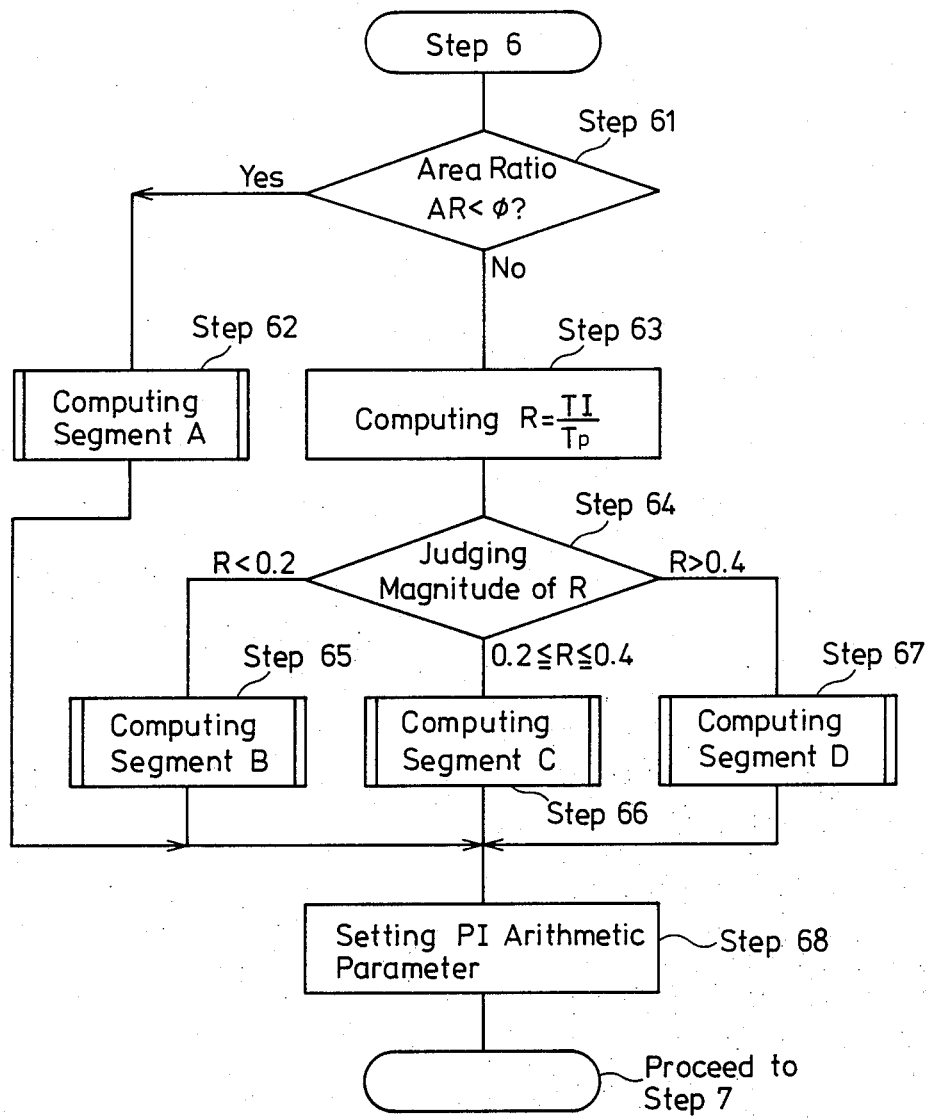
FIG. 10 is a flow chart depicting details of Step 6 of FIG. 7.

FIG. 10 depicts greater details of Step 6. Parameter arithmetic means 33 initially judges whether area ratio AR obtained by the waveform observing means 31 is smaller than "0" set by arithmetic segment setting means 32 or not (Step 61). Based on this Step, a judgment is made whether or not the PI arithmetic parameters which are now set in PI controlling means 2 come into segment A which will be discussed later. More specifically, if area ratio AR is smaller than "0", non-oscillatory response properties are exhibited. It is judged that the controllability, based on the present PI arithmetic parameters, exists in segment A. The PI arithmetic parameters are computed in accordance with the formulas for obtaining the PI arithmetic parameters set in segment A of setting means 32. Subsequent to this Step, computation for modifying the PI arithmetic parameters is carried out (Step 62).

When the area ratio $AR \geq 0$ (i.e. the case of "No" in Step 61) a value of R is arithmetically given by Step 63 as follows $$\frac{\text{integral arithmetic parameter Ti}}{\text{oscillation cycle Tp}}$$

The magnitude of value R is compared with a predetermined value set in the arithmetic segment setting means 32 (Step 64). Namely, when R<0.2, it is judged that the presently set PI arithmetic parameters exist in a segment B. Then, the program proceeds to Step 65. If $0.2 \leq R \leq 0.4$, the PI arithmetic parameters are, it can be considered, in segment C; and the program moves to Step 66. When R>0.4, it is judged that the same parameters exist in segment D; and the program moves to Step 67.

Figure 11:
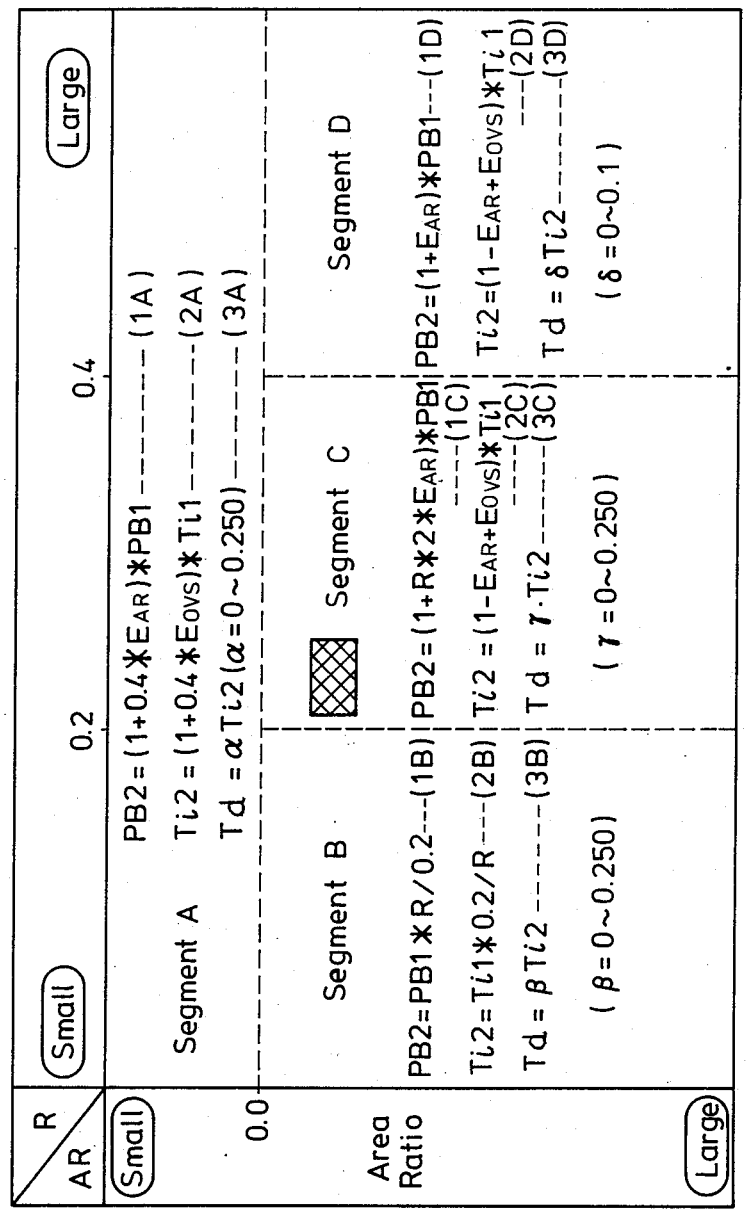
FIG. 11 is an explanatory chart depicting concepts of respective segments and operational expressions of the individual segments which are prescribed in the parameter computing means.

As discussed above, the division into segments A, B, C and D is based on empirical rules that have so far been established. FIG. 11 depicts one example of concepts and operational expressions in the individual segments. In FIG. 11, the axis of abscissa represents the value R, and axis of ordinate represents area ratio AR. A region is defined as area ratio AR=0.2 and R=0.2. A region in the vicinity of the hatched portion is the region for the set value. Such PI arithmetic parameters that the controllability approximates the set value from ever segment can be obtained by performing predetermined arithmetic operations in accordance with the respective operational expressions for seeking proportional arithmetic parameter PB and integral arithmetic parameter Ti which are indicated for every segment. It should be noted that the invention can be similarly applied to a controller which includes a differential (D) computation. For reference, FIG. 11 also shows operational expressions for obtaining a differential arithmetic parameter Td.

In the operational expressions of FIG. 11, symbols PB1 and PB2 denote this-time and next-time proportional arithmetic parameters. Symbols Ti1 and Ti2 represent this-time and next-time integral arithmetic parameters, i.e. integral time. Symbol Eovs designates an error overshoot (calculated, reference overshoot — measured overshoot); and EAR designates an error area ratio (calculated, reference area ratio measured area ratio).

Formulas (1A) and (2A) of segment A are applied to Step 62. Pro portional arithmetic parameter PB2 and integral arithmetic parameter Ti2 are required to exceed this-time parameters in accordance with values of error are ratio EAR and error overshoot Eovs. If EAR and Eovs are each 0 PB2 and Ti2 are equalized to values of this-time parameters PB1 and Ti1.

Formulas (1B) and (2B) of segment B are applied to Step 65. The proportional arithmetic parameter PB2 and integral arithmetic parameter Ti2 are required to fall below this-time parameter at a rate of R/0.2, wherein R is smaller than 0.2.

Similarly, formulas (1C) and (2C) of segment C are applied to Step 66, and formulas (1D) and (2D) of segment D are applied to Step 67

In Step 68, the proportional and integral arithmetic parameters are obtained in any one of Steps 62, 65, 66 and 67 are reset in PI controlling means 2.

As a result, an adjustment is automatically made in PI controlling means 2 so that controllability finally comes to an optimum set value, even if the proportional and integral arithmetic parameters set therein are of any value.

In the description given above, the waveform observing means 31 is intended to observe the waveform of the deviation signal between process variable PV and control set value SV. However, supposing that the control set value is fixed, waveform observing means 31 may be arranged to observe the waveform of process variable PV. This explanation is made by taking an example of an adjusting means including the controlling means but the adjusting means which involves the use of a PID controlling means is also applicable.

As discussed, the ratio of area $A_1$ to area $A_2$, which are associated with the process variable or the deviation signal at the generation timings of the first and second peaks of the response waveform, serves as one of the evaluation indexes for defining the response pattern of the process variable or the deviation signal generated with modifications of the control set value or fluctuations in load of the process. Based on the evaluation indexes, including the area ratio, the PI arithmetic parameters are modified to obtain the optimum values. Hence, the self-tuning controller of the invention is capable of setting the optimum PI arithmetic parameters within a short period of time without being influenced by noises.

Figure 12:
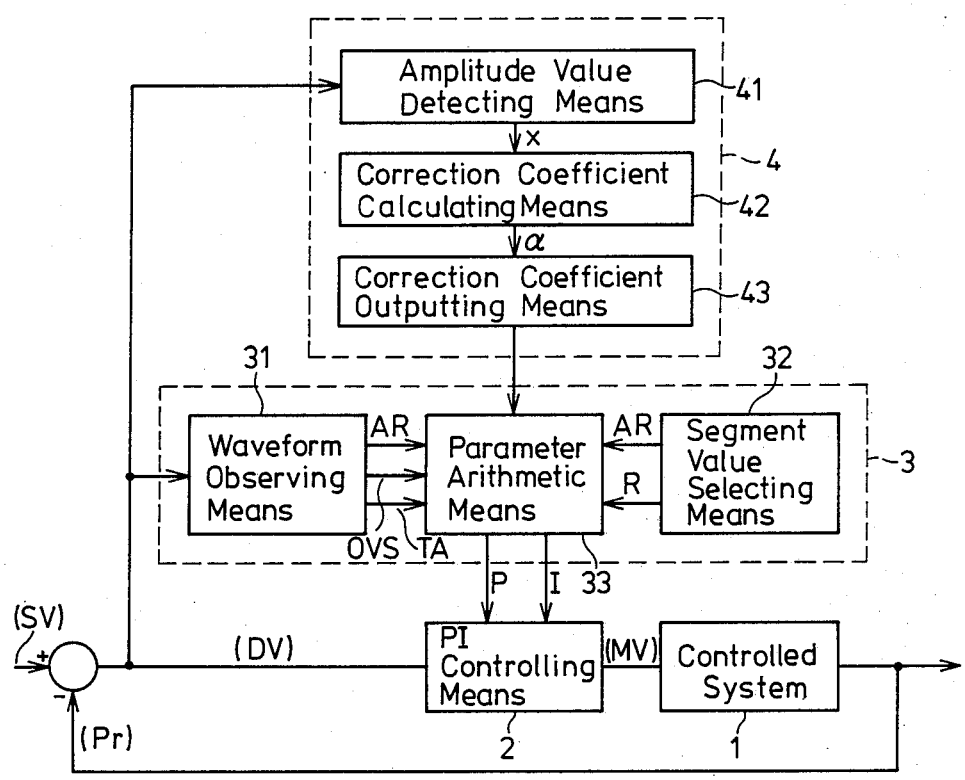
FIG. 12 is a block diagram depicting a function of another illustrative embodiment of the invention.

Referring to FIG. 12, which depicts the function of another illustrative embodiment, there is provided tuning quantity correcting means 4 for correcting the tuning quantity computed by parameter arithmetic means 33 in connection with the magnitude of the response waveform. Correcting means 4 comprises amplitude value detecting means 41 for detecting a magnitude, e.g. maximum peak value x, of the process variable or the deviation signal, i.e. deviation signal DV; correction coefficient calculating means 42 for calculating a correction coefficient $\alpha$ with respect to magnitude x of deviation signal DV; correction coefficient outputting means 43 for correcting or modifying the PI arithmetic parameters set in PI controlling means 2 in accordance with correction coefficient $\alpha$ by outputting correction coefficient $\alpha$ to parameter arithmetic means 33.

In tuning quantity correcting means 4, correction coefficient calculating means 42 inputs amplitude value x detected by amplitude value detecting means 41, and correction coefficient $\alpha$ is calculated in accordance with amplitude value x.

Figure 13:
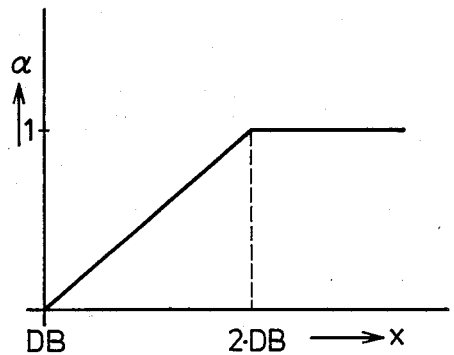
FIG. 13 is a graph depicting the relation between amplitude value and correction coefficient.

Let the predetermined dead band, which is a threshold value, be DB. Then, when $x \geq 2DB$, $\alpha = 1$; and when $DB < x < 2DB$, $\alpha = K(x-DB)/DB$ FIG. 13 illustrates the relation between amplitude x and coefficient $\alpha$. When the range of amplitude x is expressed such that $DB < x < 2DB$, the correction coefficient $\alpha$ becomes a value smaller than 1 proportional to x. If the relation of $x = 2DB$ is established, the correction coefficient $\alpha$ becomes 1.

Correction coefficient outputting means 43 outputs the calculated correction coefficient $\alpha$ to parameter arithmetic means 33. Subsequently, parameter arithmetic means 33 using coefficient $\alpha$ computes the arithmetic parameters, i.e. proportional arithmetic parameter PB and integral arithmetic parameter PI, to be set in PI controlling means 2 according to the following formulas and then corrects them.

$$PB2 = (1 + \alpha * EAR) * PB1 \quad (6)$$

$$TI2 = (1 + \alpha * EVOS) * TI1 \quad (7)$$

PB2 is the next-time proportional arithmetic parameter, PB1 is the this-time proportional arithmetic parameter, TI2 is the next-time integral arithmetic parameter, TI1 is the this-time integral arithmetic parameter, EAR is the error area ratio, EVOS is the error overshoot and $\alpha$ is the correction coefficient.

PI controlling means 2 effects the PI arithmetic operation by using the PI arithmetic parameters which are momentarily set and modified by parameter arithmetic means 33, and outputs the arithmetic results identified as manipulation signals MV to controlled system 1.

Figure 14:
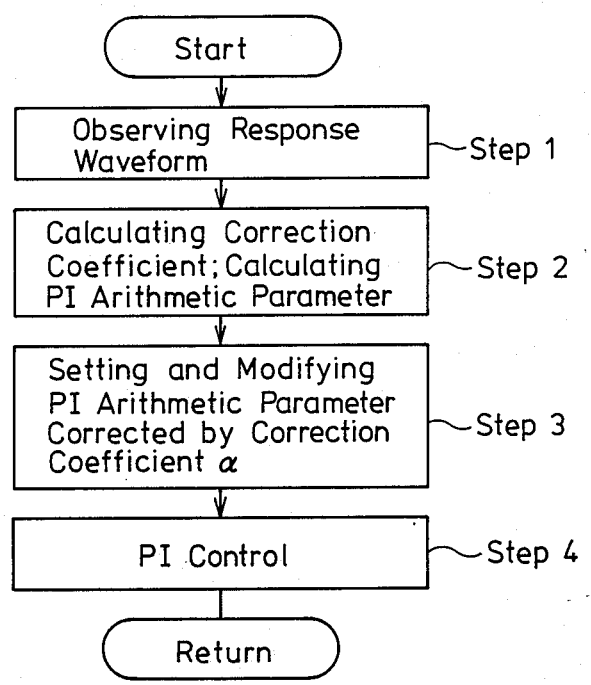
FIG. 14 is a flow chart depicting a principal operation of the controller.

FIG. 14 is a flow chart showing the principal operation of the controller of FIG. 12. The process begins with the observation of the response waveform by use of waveform observing means 31 (Step 1). Next, tuning quantity correcting means 4 calculates correction coefficient $\alpha$ and at the same time parameter arithmetic means 33 computes PI arithmetic parameters (Step 2). Subsequently, parameter arithmetic means 33 sets the PI arithmetic parameters corrected by coefficient $\alpha$ in PI controlling means 2, and then modifies these parameters (Step 3). PI controlling means 2 performs PI control on the basis of the PI arithmetic parameters set therein (Step 4).

Figure 15:
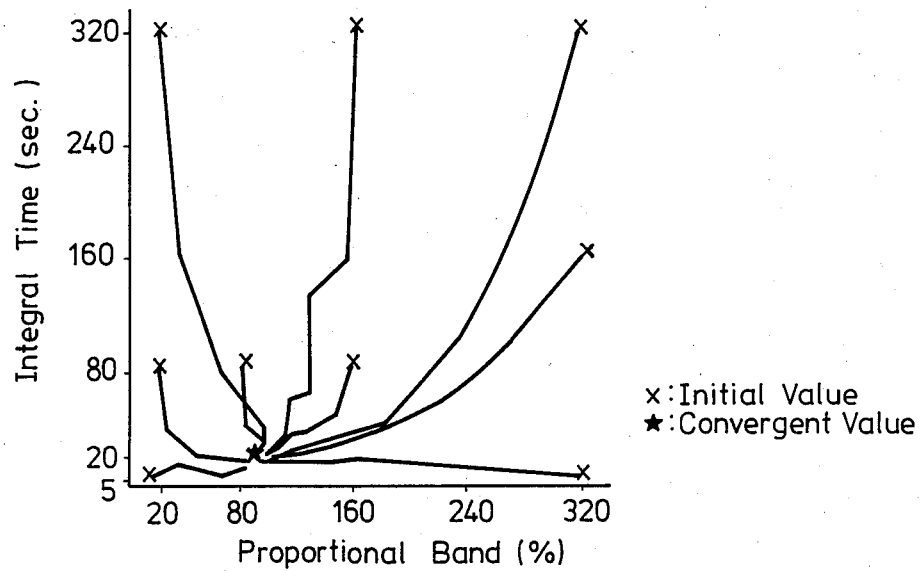
FIG. 15 is a graph depicting the result of simulation by a self tuning controller of the invention.
Figure 16:
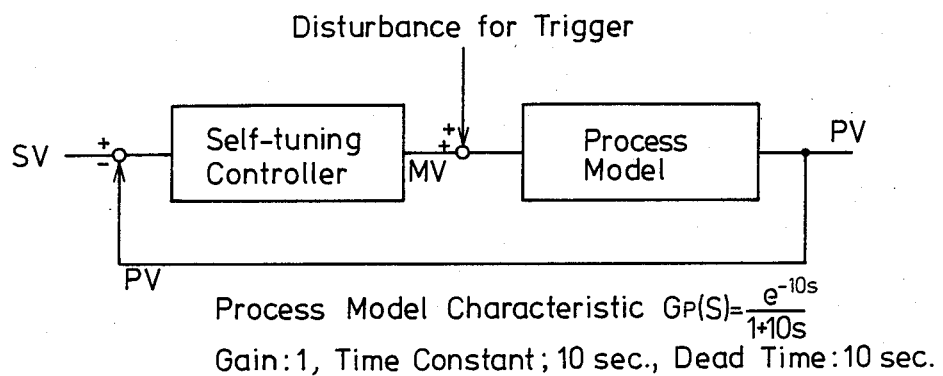
FIG. 16 is a block diagram depicting a process model used for the simulation of FIG. 15.

The following two points are characteristic of the FIG. 12 embodiment. First, the operations described in Steps 1, 2 and 3 are invariably executed regardless of the results of the observed waveform in Step 1. Second, arithmetic parameters PB2 and TI2, which are set in PI controlling means 2 and are then modified in Step 3, are corrected in conformity with the formulas (6) and (7). Accordingly, if the amplitude of the response waveform is small, the optimum arithmetic parameters can be tuned in a short period of time FIG. 15 shows simulation results given by the invention controller, wherein convergent loci are depicted in which a variety of initial values converge to the optimum value, when imparting a control target of 10% overshoot to the process model depicted in FIG. 16. FIG. 16 depicts a system which simulates the FIG. 15 results, wherein the model characteristics are $Gp(S) = (e10s)/1 + 10s$; gain is 1; time constant is 10 sec., and dead time is 10 sec., all as depicted in the figure. Whatever initial values are chosen, the initial values converge closely to the optimum value in a short period of time with several trials, whereby satisfactory results are attained In the FIG. 15 embodiment, the calculating formula for the correction coefficient $\alpha$ and the operational expression for the parameter arithmetic means 33, are not confined to those described. The embodiment discusses a controller equipped with a PI controlling means. However, a controller having PID controlling means is also applicable Correction coefficient $\alpha$ varies in accordance with amplitude x of the response waveform. The variations may, however, be made under other conditions, such as, for example, a cycle, or the like. Also, the discussion are directed to parameter arithmetic means 33 automatically determining the PI arithmetic parameters on the basis of the results of waveform observations of waveform observing means 31. In this embodiment, the presumption is that the initial values of PI arithmetic parameters are input-set by human operation. In some cases, however, it is more convenient to automatically set the initial values of PI arithmetic parameters at the time of start-up, rather than by manual setting, depending on the properties of, for example, the controlled system or process 1.

Figure 17:
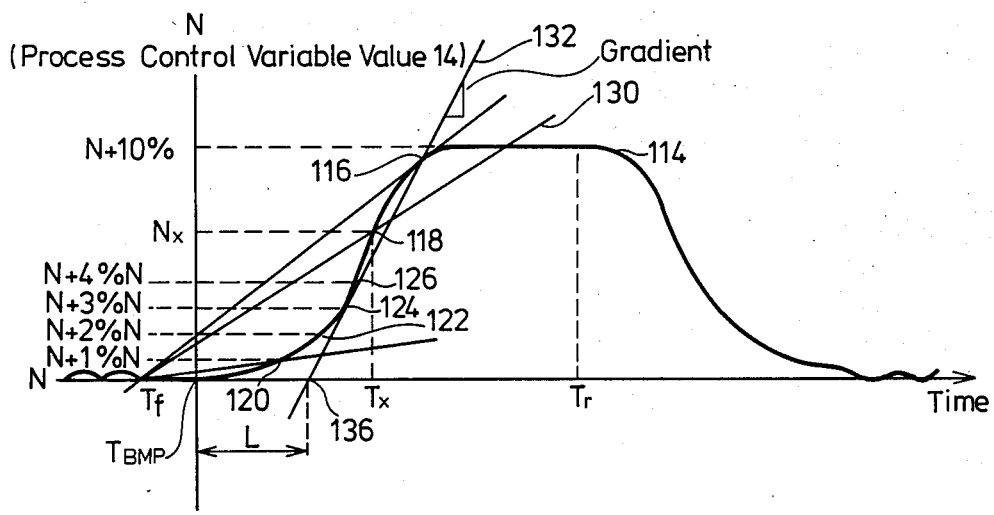
FIG. 17 is a waveform diagram depicting a conventional method of performing identification processing of the process.

FIG. 17 illustrates the operation of a pre-adapted, such as disclosed in U.S. Pat. No. 4,602,326, for automatically setting the initial values of the PI arithmetic parameters. In FIG. 17, a locus 114 indicates a step response when process variable PV is stepwisely varied from a steady-state value N to a value that is 10% greater than N. A bent point of locus 114 is determined by using a technique which is referred to as the cord method.

To be more specific, a fixed point, which is equivalent to 15 sec. before point $T_{BMP}$ at which a step variation is given, on the horizontal axis at which the process is in the steady state is at first selected. Next, gradients of lines, e.g. line 130, connecting points on the locus 114 to the fixed point Tf are sequentially calculated. A point i.e. bent point, at which the gradient of this line, called cord, reaches its maximum is determined. Upon determination of this bent point 116, e.g. line 132, having the maximum gradient is searched among the lines connecting the bent point 116 to predetermined points 120,122,124 and 126 at which the locus 114 ascends by 1%, 2%, 3%, and 4% from the steady state value N.

After maximum gradient 132 has been obtained, an intersection 136 of line 132 and the horizontal axis is sought. A dead time L of the process is known from a period ranging from point $T_{BMP}$ to intersection 136. A time constant inclination, i.e. process sensitivity, SEN is also obtained from the gradient of maximum gradient line 132.

The maximum gradient line of the step response is sought in the above process; and the dead time L and process sensitivity SEN are obtained. Based on these steps, the PI arithmetic parameters are computed. This method requires a substantial number of procedures. If the dead time is short, the lines leading from fixed point Tf to points on locus 114 approach each other. It is therefore impossible to obtain an accurate maximum gradient line. It follows that the PI arithmetic parameters computed on the basis of this maximum gradient line become values slightly greater than the proper values.

The pre-adapter applied to the self-tuning controller of the invention gets the maximum gradient line of the step response using simple procedures. This maximum gradient line is corrected by the correction coefficient obtained by the predetermined arithmetic operation. As a result, adequate initial values of PI arithmetic parameters are provided.

Figure 18:
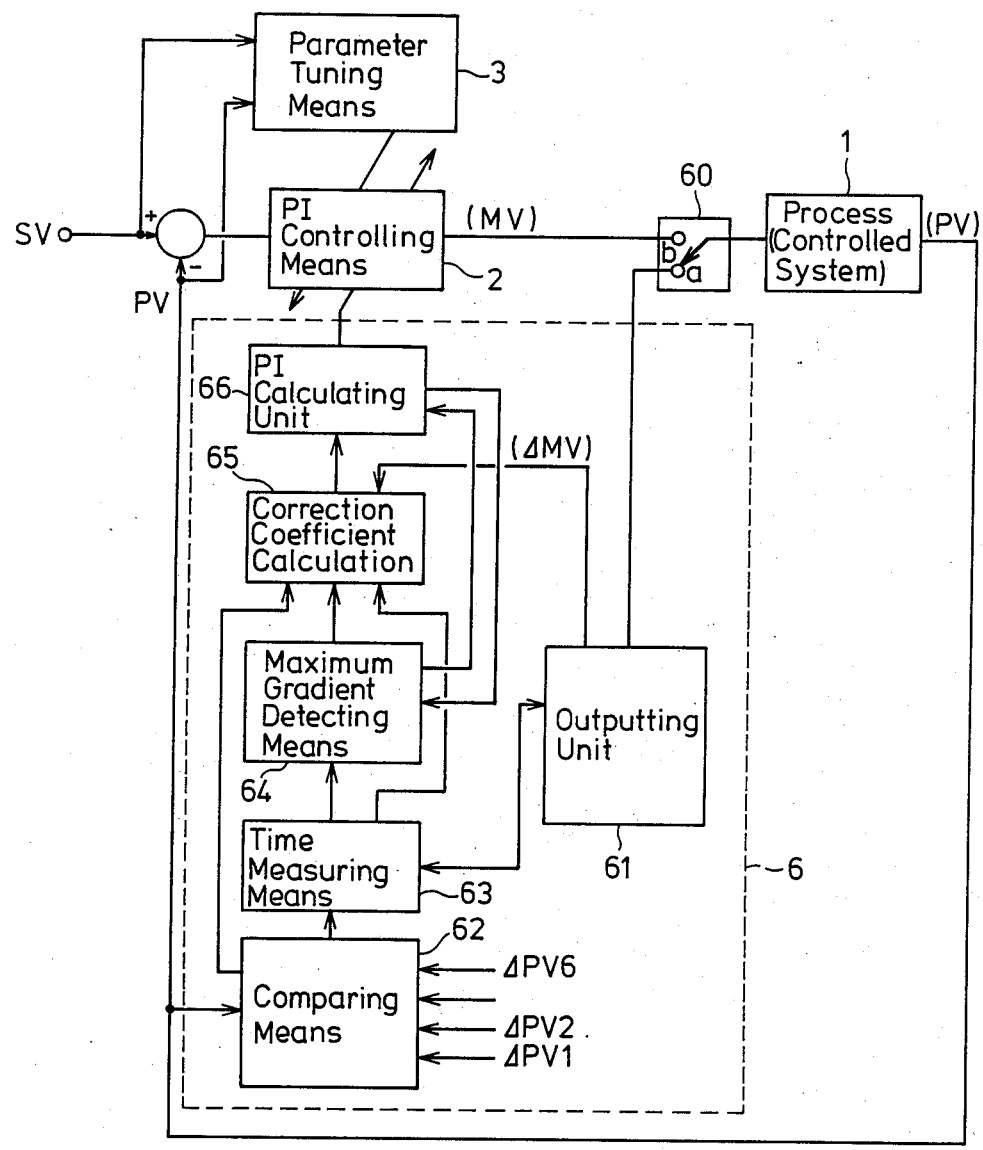
FIG. 18 is a block daigram depicting a function of a still further illustrative embodiment of the invention.

FIG. 18 depicts another illustrative self-tuning controller comprising a pre-adapter 6 for automatically initializing the PI arithmetic parameters at the time of start-up. Pre-adapter 6 comprises a switch 60 connected to contact a at a process identifying time (e.g. at the time of start up); an outputting unit 61 for outputting a step variation ΔMV to controlled system or process 1; comparing means 62 for comparing the step response of a measurement signal, i.e. a waveform observed signal PV transmitted from process 1 with several set values ΔPV1, ΔPV2 ... ΔPVn; time measuring means 63 for measuring timings $t_1$ through $t_n$ at which the step response passes through respective set values ΔPV1 to ΔPVn; maximum gradient detecting means 64 for obtaining a maximum gradient r of the step response from individual set values ΔPV1 to ΔPV6 and time measured values; correction coefficient calculating means 65 for calculating a correction coefficient E by executing a predetermined arithmetic operation after inputting set values ΔPV1, ΔPV2 ... ΔPVn, timings $t_1, t_2, \ldots, t_n$ at which the step response passes through these set values and the information on step variation quantity ΔMV and fluctuation quantity ΔPV of the step response; and a PI arithmetic parameter computing unit 66 for computing the PI arithmetic parameters while introducing correction coefficient E by inputting the information concerning coefficient E by inputting the information concerning the maximum gradient rmax from maximum gradient detecting means 64 and also the information sent from correction coefficient calculating means 65.

Change over switch 60 comprises contacts a and b, the arrangement being such that switch 60 is connected to contact a in, for example, a start up mode, and is connected to contact b in an ordinary automatic control mode.

Figure 19:
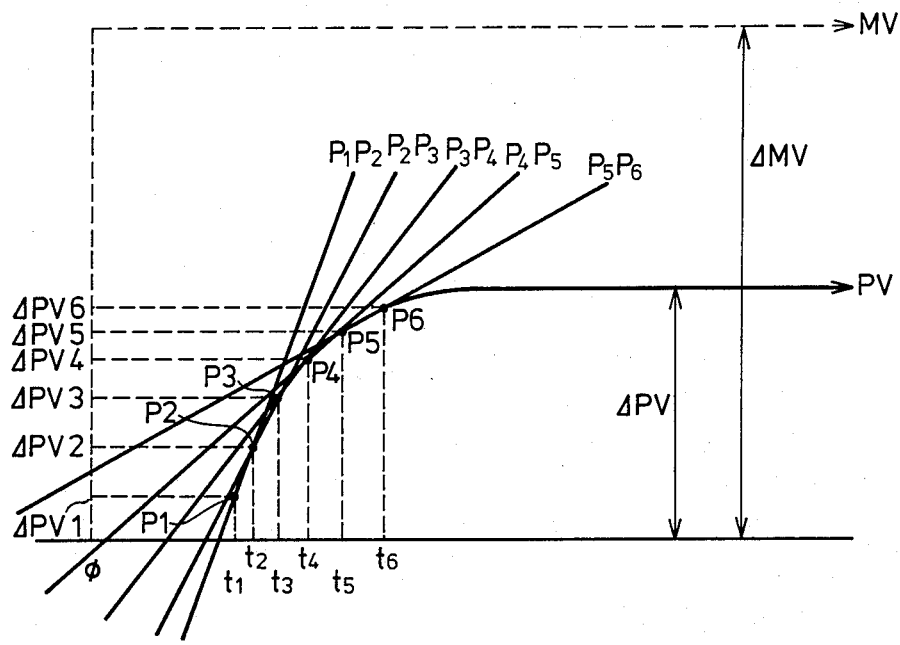
FIG. 19 is a waveform diagram depicting a step response to a step variation.

Next, the operation of the FIG. 18 embodiment is as follows. To start with, change over switch 60 is connected to contact a and is brought into the start up mode. Turning to FIG. 19, which depicts a waveform diagram of the step response ΔPV given by process 1 when imparting step variation ΔMV depicted with a broken line from outputting unit 61 of pre-adapter 6 through changeover switch 60 to process 1 in the start up mode.

Individual set values ΔPV1, ΔPV2, ..., ΔPV6 which are originally different from each other are set in comparing means 62. Set values ΔPV1 through ΔPV6 are equivalent to, for example, 1% to 6% of full span value of process variable PV. Time measuring means 63 is intended to measure timings $t_1, t_2, \ldots, t_6$ at which step response ΔPV reaches individual set values ΔPV1, ΔPV2 ... ΔPV6.

Maximum gradient detecting means 64 inputs the information on set values ΔPV to ΔPV6 and on timings $t_1$ through $t_6$ at which the step response passes through these set values, and also computes each of the gradients r of the lines by which points $P_1-P_2, P_2-P_3, \ldots P_5-P_6$ are respectively joined in accordance with the following equation (8). Maximum gradient detecting means 64 further extracts the maximum gradient rmax.

$$\text{gradient (4)} = \frac{\Delta PV_n - \Delta PV_{n-1}}{t_n - t_{n-1}} = \frac{\Delta PV_o}{\Delta t_o} \tag{8}$$

wherein n is an integer, such as 1,2,3, .. 6.

After process 1 has settled down, correction coefficient calculating means 65 executes calculation of process gain K=ΔPV/ΔMV from step variation quantity ΔMV and the step response fluctuation quantity ΔPV, and thereafter calculates the correction coefficient E using below formula (9).

$$E = \left(\log e\left(1 - \frac{\Delta PV_{n-1}}{K^*\Delta MV}\right) - \log e\left(1 - \frac{\Delta PV_n}{K^*\Delta MV}\right)\right) * \frac{K^*\Delta MV}{\Delta PV_n - \Delta PV_{n-1}} \tag{9}$$

wherein $\Delta PV_n$ and $\Delta PV_{n-1}$ are set values corresponding to two points ($P_1$ and $P_2$ in FIG. 19) at which the maximum gradient rmax is detected, and * represents a multiplying code.

By using coefficient E and maximum gradient rmax detected by means 64, a correction value Rc is expressed by the following formula.

$$Rc = \frac{1}{E} * \frac{1}{rmax} \quad (10)$$

Computing unit 66 computes PI arithmetic parameters P and I by using step variation quantity $\Delta MV$, step response fluctuation $\Delta PV$ and set values $\Delta PV_n$ and $\Delta PV_{n-1}$ which are equivalent to two points $P_1$ and $P_2$ at which correction value Rc and maximum gradient rmax are detected.

$$R = Rc * \frac{\Delta MV}{\Delta PV_n - \Delta PV_{n-1}} \quad (11)$$

$$L = t_{n-1} - Rc * \frac{\Delta PV_{n-1}}{\Delta PV_n - \Delta PV_{n-1}} \quad (12)$$

$$P = 83 * \frac{L}{R} \quad (13)$$

$$I = 0.5 * L \quad (14)$$

wherein R is the time constant gradient after effecting correction, L is the dead time, P is the proportional arithmetic parameter and I is the integral arithmetic parameter. The PI arithmetic parameters obtained by formulas (13) and (14) are automatically set as initialized values in PI controlling means 2.

After the PI arithmetic parameters ahave been set in controlling means 2, change over switch 60 is connected to contact b, thereby changing to the automatic control mode. Subsequently, manipulation signals MV are computed on the basis of PI arithmetic parameters set by parameter tuning means 3, and manipulation signal MV is outputted to process 1

Figure 20:
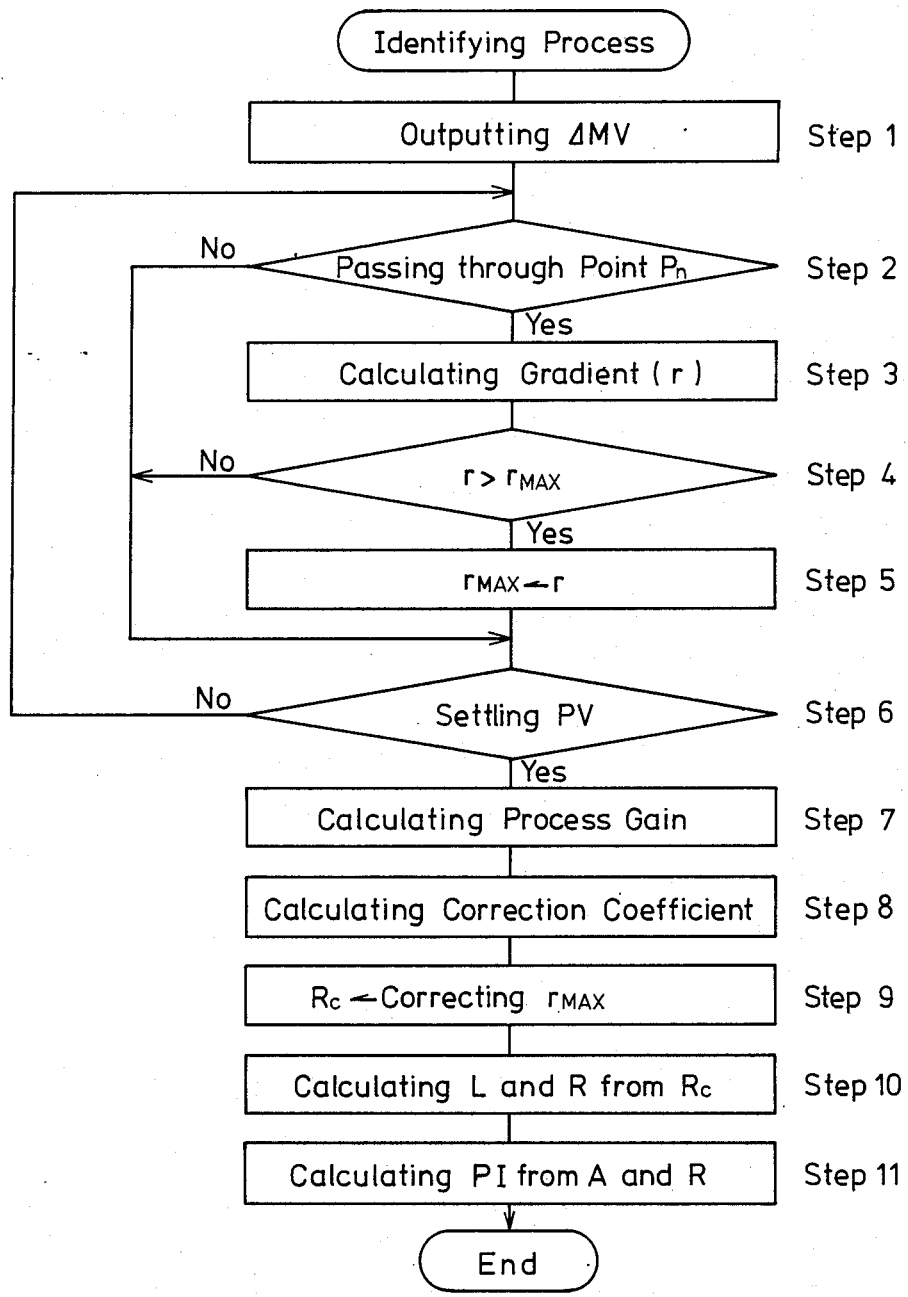
FIG. 20 is a flow chart depicting a principal operation of an identification processing means.

Referring to FIG. 20, which depicts operation of pre-adapter 6 of FIG. 18, when starting the identification, an approximately 5% step variation $\Delta MV$ with respect to the full span value of manipulated variable MV is at first outputted from outputting unit 61 to process (Step 1). Subsequently, step response $\Delta PV$ from process 1 is observed, and judgment made as to whether or not the step response passes through several previously set values $\Delta PV1$, $\Delta PV2$ ... $\Delta PVn$ ( Step 2). Gradient (r) is computed from the set values and the timings at which the step response passes through those set values ( Step 3). Then, the maximum gradient is detected ( Steps 4 and 5).

After these steps, the next task is to judge whether or not process variable PV is settled down (Step 6). If process variable PV is settled down, calculations of process gain K, correction coefficient E, the correction value, dead time L and time constant gradient R are performed ( Steps 7 to 10). The PI arithmetic parameters are computed from dead time L and time constant gradient R ( Step 11).

taking the correction value into consideration. Accordingly, the proper PI arithmetic parameters are computed.

Figure 21:
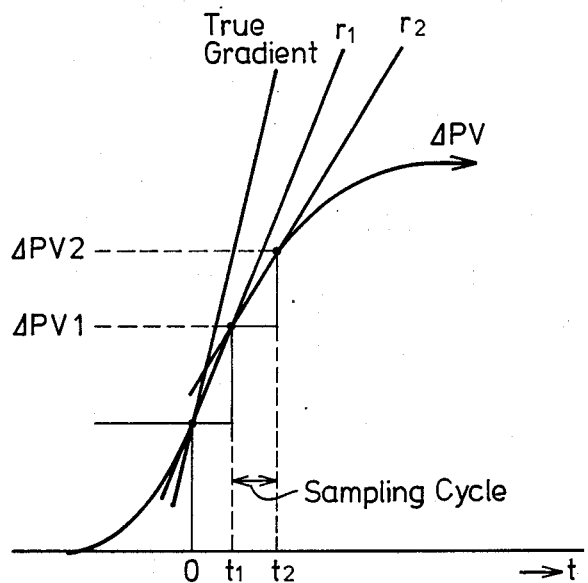
FIGS. 21 and 22 are explanatory diagrams depicting the situation where error is eliminated by performing arithmetic which introduces a correction coefficient.

Also, in the invention, an error can be eliminated by effecting an arithmetic operation which introduces the correction coefficient. In FIG. 20, the maximum gradient, which has been computed in Steps 2 through 5, is obtained in accordance with formula (8). However, it is impossible to make $\Delta t_0$ and $\Delta PV_0$ infinitesimal. Accordingly, the maximum gradient rmax computed in formula (8) is larger than a true gradient rs when the process variable PV exhibits a time lag of the first order, resulting in intervention of an error. Namely, in step response $\Delta PV$ depicted in FIG. 21, gradients $r_1$ and $r_2$ of the timings $t_1$ and $t_2$ are given by the following $$r_1 = \frac{\Delta PV_1}{t_1} \text{ and } r_2 = \frac{\Delta PV_2 - \Delta PV_1}{t_2 - t_1}$$

while the true maximum gradient r is expressed as follows $$r = \lim_{\Delta t \to \phi} \frac{\Delta PV}{\Delta t}$$

wherein the error is to be created.

If the maximum gradient is in excess of the true value, the process time constant is larger than the real time constant, and process dead time L is so identified as to be smaller than the real dead time. It follows that the PI arithmetic parameters computed on the basis of the above described values become danger values.

Figure 22:
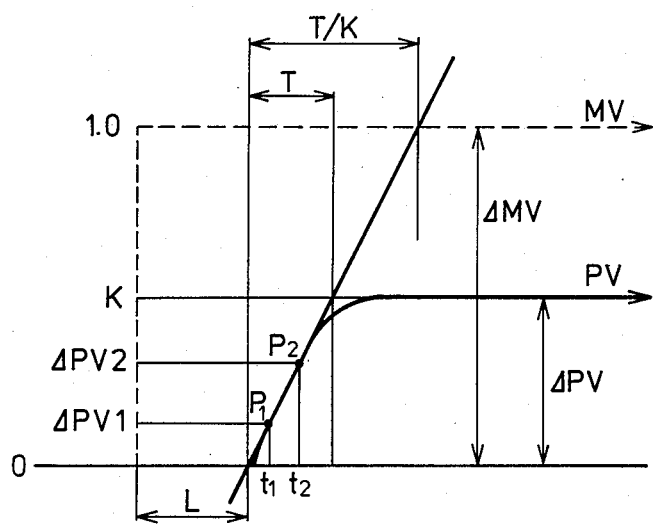

FIG. 22 shows step response $\Delta PV$ in a first order time lage system when providing the step variation $\Delta MV$. Let the process time constant be T, and let the process gain be K. Then, the step response $\Delta PV$ is expressed by the following formula.

$$\Delta PV = (1 - e^{-(t/T)}) * K * \Delta MV \quad (15)$$

from formula (15), $$t = -T \cdot \log e \left(1 - \frac{\Delta PV}{K * \Delta MV}\right) \quad (16)$$

In FIG. 22, a value R' (=T/K) of a process response time (T/K) obtained from a line segment $P_1 - P_2$ is expressed by the following formula.

$$R' = (t_2 - t_1) * \frac{\Delta MV}{\Delta PV_2 - \Delta PV_1} \quad (17)$$

When formula (16) is applied to formula (17), $$\begin{aligned}
R' &= (-1) * T * \left(\log e \left(1 - \frac{\Delta PV_2}{K * \Delta MV}\right) - \log e \left(1 - \frac{\Delta PV_1}{K * \Delta MV}\right)\right) * \frac{\Delta MV}{\Delta PV_2 - \Delta PV_1} \\
&= \frac{T}{K} * \left(\log e \left(1 - \frac{\Delta PV_1}{K * \Delta MV}\right) - \log e \left(1 - \frac{\Delta PV_2}{K * \Delta MV}\right)\right) * \frac{K * \Delta MV}{\Delta PV_2 - \Delta PV_1} \\
&= E * \frac{T}{K}
\end{aligned} \quad (18)$$

Advantageously, this embodiment has these characterisitcs, namely, that the correction coefficient and the correction value are calculated in Steps 8 and 9, and the dead time L and time constant gradient R are computed wherein error (E) is as follows.

$$E = \left( \log e \left( 1 - \frac{\Delta PV_1}{K*\Delta MV} \right) - \log e \left( 1 - \frac{\Delta PV_2}{K*\Delta MV} \right) \right) * \frac{K*\Delta MV}{\Delta PV_2 - \Delta PV_1}$$

Hence, the error indicated by E with respect to the true value of T/K intervenes in the value R' of T/K obtained from the line segment $P_1$–$P_2$, and the true value of T/K (=Rc) is obtained by performing correction arithmetic of formula (19), set forth below, on value R' of T/K obtained from line segment $P_1$−$P_2$. This formula corresponds to formula (10). The true T/K (=Rc) is as follows.

$$T/K \text{ (true)} = \frac{1}{E} * (T/K = R') \quad (19)$$

wherein R' is obtained from the line segment $P_1$-$P_2$.

Error E is obtained by executing a calculation of formula (9) because all the values of $t_1$, $t_2$, $\Delta PV_1$, $\Delta PV_2$, $\Delta MV$, and $K=(\Delta PV)/(\Delta MV)$ are known.

The foregoing illustrative embodiment is an example wherein step response $\Delta PV$ is compared with six set values $\Delta PV1$ through $\Delta PV6$. However, step response PV may be sampled at a predetermined sampling cycle, and the maximum gradient is thereby obtained from the present value of $\Delta PV$.

The arrangement of this embodiment is such that the process resonse time (T/K) is sought from a line segment $P_n$−$P_{n-1}$ by which the two points $P_n$ and $P_{n-1}$ provided on the step response $\Delta PV$ are joined and the error intervening in the process response time is removed by the arithmetic operation. I is therefore feasible to automatically initialize the proper arithmetic parameters which accord with the process using simple procedures.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A self tuning controller comprising
PI controlling means for outputting a manipulated variable to a controlled system, said PI controlling means comprising means for obtaining said manipulated variable by performing at least proportional integral arithmetic on a deviation signal between a control set value and a process variable from a process; and
parameter tuning means for tuning said PI arithmetic parameters of said PI controlling means, said parameter tuning means comprising means for observing a waveform of said process variable or said deviation signal, and means for taking an observed result of said process variable or said deviation signal and for producing a preset response target;
wherein said parameter tuning means comprises waveform observing means for computing a first area associated with said process variable or said deviation signal extending from a first generation timing ($t_1$) of a first peak of said process variable or said deviation signal to a subsequent second generation timing ($t_2$) of a second peak and a second area associated with said process variable or said deviation signal extending from said second generation timing to a subsequent timing given by $t_2+(t_2-t_1)$, and for outputting an area ratio of said first area to said second area, as one of a plurality of evaluation indexes representing waveform patterns, and parameters arithmetic means for computing said PI arithmetic parameters on the basis of said evaluation indexes, including said area ratio, given by said waveform observing means.

2. The controller of claim 1, wherein said first area ($A_1$), said second area ($A_2$), and said area ratio (AR), are computed in accordance with the following formula in said observing means:

$$A_1 = \int_{t_1}^{t_2} (DV_1 - DV)dt$$

$$A_2 = \int_{t_1}^{t_2+(t_2-t_1)} (DV - DV_2)dt$$

$$AR = A_2/A_1;$$

wherein DV is the deviation signal between the control set value and the process variable from said process; $DV_1$ is the first peak of DV; and $DV_2$ is the second peak of DV.

3. The controller of claim 1, wherein said parameter tuning means comprises arithmetic segment setting means for selecting operational expressions for computing said PI arithmetic parameters among several arithmetic segments in accordance with said evaluation indexes, including said area ratio, and applying said operational expressions to said parameter arithmetic means.

4. The controller of claim 3, wherein said arithmetic setting means comprises means for setting segment A, segment B, segment C and segment D, sectioned according to magnitude of each of said area ratio and a value of integral arithmetic parameter divided by oscillation cycle, and means for allocating operational expressions for obtaining said PI arithmetic parameters different from each other to said segments A,B, C and D.

5. The controller of claim 4, wherein said means for allocating allocates operational expressions A,B,C and D, and D, in the following manner:

segment A, PB2=(1+0.4*EAR*)PB1 and Ti2=(1+0.4* Eovs)*Ti1;
segment B, PB2=PB1*R/0.2, and Ti2=Ti1 *·0.2/R;
segment C, PB2=(1+R*2*EAR) *PB1, Ti2=(-1−EAR+Eovs)*Ti1; and
segment D, PB2=(1+Ear) *PB1, Ti2=(1−EAR+Eovs)*Ti1;

where in PB1 is the this-time proportional arithmetic parameter, PB2 is the next-time proportional arithmetic parameter, Ti1 is the this-time integral arithmetic parameter, ti2 is the next-time integral arithmetic parameter, Eovs is the error overshoot and EAR is the error area ratio.

6. The controller of claim 5, wherein said parameter tuning means comprises
means for at first judging whether said area ratio AR is smaller han zero or not;
means for computing said PI arithmetic parameters in accordance with said operational expression allocated to said segment A when AR< zero;

means for computing said value (R) of (integral arithmetic parameter Ti)/(oscillation cycle Tp) when AR> zero;

means for computing said PI arithmetic parameters in accordance with said operational expression allocated to said segment B when the magnitude thereof is defined such as R<0.2;

means for computing said PI arithmetic parameters in accordance with said operational expression allocated to said segment C when $0.2 \leq R \leq 0.4$; and means for computing said PI arithmetic parameters in accordance with said operational expression allocated to said segment D when R>0.4.

7. In a self tuning controller having PI controlling means for effecting at least proportional integral arithmetic on a deviation signal between a process variable and a control set value, the improvement comprising waveform observing means for seeking an evaluation index of a response waveform of said process variable or said deviation signal by observing said response waveform of said process variable or said deviation signal;

arithmetic segment setting means for selecting operational expressions for obtaining PI arithmetic parameters on the basis of said measurement evaluation index of said response waveform obtained by said waveform observing means;

parameter arithmetic means for computing said PI arithmetic parameters to be set in said PI controlling means by using said operational expressions selected by said arithmetic segment setting means; and tuning quantity correcting means for correcting a tuning quantity of said PI arithmetic parameters obtained by said parameter arithmetic means in accordance with an amplitude of said response waveform.

8. The controller of claim 7, wherein said tuning quantity correcting means corrects said PI arithmetic parameters on the basis of a correction coefficient ranging from 0 to 1 in accordance with an amplitude of said response waveform.

9. The controller of claim 7, wherein said parameter arithmetic means effects tuning operation on said PI controlling means regardless of magnitude of difference between said measurement evaluation index of said response waveform and a reference evaluation index.

10. A self tuning controller comprising

PI controlling means for performing at least proportional integral arithmetic on a deviation between a control set value and a process variable from a controlled system, and comprising a pre-adapter comprising an outputting means for outputting a step variation to a process; an observing means for observing a step response from said process; and a PI calculating means for calculating proportional integral arithmetic parameters on the basis of an observed result given by said observing unit and setting said proportional integral arithmetic parameters in said PI controlling means;

said observing means obtaining a maximum gradient line from timings ($\Delta t$) at which said step response passes through a plurality of different set values ($\Delta PVn$ and $\Delta PVn-1$) and from a different ($\Delta Pvn-\Delta PVn-1$) between said different set values after observing said step response and further obtaining a correction coefficient (E) by performing a predetermined arithmetic operation on the basis of said set values ($\Delta PVn$ and $\Delta PVn-1$), a step variation quantity $\Delta MV$ and a step response fluctuation quantity $\Delta PV$;

said PI calculating unit calculating said PI arithmetic parameters by making use of information obtained from said maximum gradient and said correction coefficient (E).

11. The controller of claim 10, wherein said correction coefficient (E) is defined by $$E = \left( \log e \left( 1 - \frac{\Delta PVn - 1}{K^*\Delta MV} \right) - \log e \left( 1 - \frac{\Delta PVn}{K^*\Delta MV} \right) \right) * \frac{K^*\Delta MV}{\Delta PVn - \Delta PVn - 1}$$

wherein K is $(\Delta PV)/(\Delta MV)$.

12. A method for automatically tuning the proportional (P) and integral (I) arithmetic parameters of a self tuning controller of a process having a process variable signal, comprising the steps of generating a deviation signal between a control set value and the process variable signal;

computing a first area associated with said process variable signal or said deviation signal extending from a first generation timing ($t_1$) of a first peak of said process variable signal of said deviation signal to a subsequent second generation timing ($t_2$) of a second peak;

computing a second area associate with said process variable signal or said deviation signal extending from said second generation timing to a subsequent timing given by $t_2+(t_2-t_1)$;

outputting an area ratio of said first area to said second area, as one of a plurality of evaluation indexes representing wave form patterns;

computing said PI arithmetic parameters on basis of said evaluation indexes, including said area ratio; and automatically tuning PI arithmetic parameters of the self tuning controller.

* * * * *